(12) United States Patent
Aviyam et al.

(10) Patent No.: US 10,664,448 B2
(45) Date of Patent: *May 26, 2020

(54) STREAMLINED PADDING OF DEDUPLICATION REPOSITORY FILE SYSTEMS (71) Applicant: INTERNATIONAL BUSINESS MACHINES CORPORATION, Armonk, NY (US)

(72) Inventors: Oded Aviyam, Tel Aviv (IL); Shira Ben-Dor, Givat Shmuel (IL); Joseph W. Dain, Vail, AZ (US); Gil E. Paz, Yehud (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 392 days.

This patent is subject to a terminal disclaimer.

(21) Appl. No.: 15/793,251

(22) Filed: Oct. 25, 2017

(65) Prior Publication Data
US 2018/0046642 A1   Feb. 15, 2018

Related U.S. Application Data (63) Continuation of application No. 14/942,362, filed on Nov. 16, 2015, now Pat. No. 9,836,475.

(51) Int. Cl.
G06F 16/17     (2019.01)
G06F 16/174    (2019.01)
G06F 16/16     (2019.01)
G06F 16/23     (2019.01)

(52) U.S. Cl.
CPC ........ G06F 16/1748 (2019.01); G06F 16/164 (2019.01); G06F 16/174 (2019.01); G06F 16/1744 (2019.01); G06F 16/2365 (2019.01)

(58) Field of Classification Search
CPC .................................... G06F 16/1748
USPC ........................................ 707/692
See application file for complete search history.

(56) References Cited

U.S. PATENT DOCUMENTS

| 8,108,353 | B2 | 1/2012 | Balachandran et al. |
| 8,412,848 | B2 | 4/2013 | Therrien et al. |
| 8,607,017 | B2 | 12/2013 | Condict |
| 8,645,333 | B2 | 2/2014 | Balachandran et al. |
| 8,903,877 | B1 | 12/2014 | Vempati et al. |
| 8,977,812 | B1 | 3/2015 | Chen et al. |
| 9,104,328 | B2 | 8/2015 | Hayasaka et al. |
| 9,430,164 | B1 | 8/2016 | Botelho et al. |

(Continued)

Primary Examiner — Hicham Skhoun
(74) Attorney, Agent, or Firm — Griffiths & Seaton PLLC (57) ABSTRACT Various embodiments for repository management in a data deduplication system, by a processor device, are provided. Metadata of an inode structure of an entire pre-allocated file system is captured, exported, and compressed from an existing deduplication appliance, the pre-allocated file system comprising a fully padded file system. The exported and compressed metadata of the pre-allocated file system is decompressed and imported into a data deduplication repository of a new deduplication appliance having an identical file system size as within the existing deduplication appliance, to initially configure or subsequently scale the inode structure of a file system of the data deduplication repository of the new deduplication appliance efficiently.

21 Claims, 3 Drawing Sheets (56) References Cited

U.S. PATENT DOCUMENTS

| | | |
|---|---|---|
| 2011/0218973 A1* | 9/2011 | Pendlebury ......... G06F 16/1748 |
| | | 707/692 |
| 2012/0158675 A1 | 6/2012 | Gupta et al. |
| 2013/0046740 A1 | 2/2013 | Li et al. |
| 2015/0074064 A1 | 3/2015 | Goldberg et al. |
| 2015/0142755 A1 | 5/2015 | Kishi |
| 2015/0242309 A1* | 8/2015 | Talagala .............. G06F 12/0246 |
| | | 711/103 |

* cited by examiner

STREAMLINED PADDING OF DEDUPLICATION REPOSITORY FILE SYSTEMS

CROSS REFERENCE TO RELATED APPLICATIONS

This Application is a Continuation of U.S. patent application Ser. No. 14/942,362, filed on Nov. 16, 2015.

BACKGROUND OF THE INVENTION

Field of the Invention

The present invention relates in general computing systems, and more particularly to, various embodiments for repository management in data deduplication systems in computing storage environments.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be DE-duplicated using standard deduplication techniques so long as specific metrics are met.

SUMMARY OF THE INVENTION

Various embodiments for repository management in a data deduplication system, by a processor device, are provided. In one embodiment, metadata of an inode structure of an entire pre-allocated file system is captured, exported, and compressed from an existing deduplication appliance, the pre-allocated file system comprising a fully padded file system. The exported and compressed metadata of the pre-allocated file system is decompressed and imported into a data deduplication repository of a new deduplication appliance having an identical file system size as within the existing deduplication appliance, to initially configure or subsequently scale the inode structure of a file system of the data deduplication repository of the new deduplication appliance efficiently.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20, (or even greater) times the original storage capacity. In other words, the same user, with the benefit of deduplication technology, essentially has the capacity of ten storage units where the user originally had one, without any additional space or power requirements.

In some deduplication systems, capacity on the file systems is pre-allocated in order to prevent the operating system from having to stop in the middle of runtime activities and allocate additional space on the fly which can slow down processing and cause poor performance. To pre-allocate the content of the file system, a special "filled" bit in the file system inode metadata structure is set for each block. The term sometimes used in the industry for this pre-allocation operation is "padding" a file system. Using traditional fallocate processing (writing zeros to the file system), the operation is prohibitively time consuming, especially on Enterprise class data deduplication systems such as the IBM® ProtecTIER™ deduplication system which can scale up to 1 Petabyte (PB) of physical deduplication repository capacity per system. In order to pre-allocate a file system of such capacity to provide optimal performance, a different solution is needed.

One traditional solution is to issue a fallocate command to the file system and intercept the input/output operations (I/O) at the last stack in the layer. Upon interception, it is immediately returned such that higher level functions and software assume that the I/O has completed to the back-end disk, when in fact no write actually occurred to the disk. In modern operating this mechanism is no longer supported.

Another solution is to leverage the capability of storage area network (SAN) devices to offload the zeroing out operation to the back-end storage. For example, VMWare® vStorage™ application program interfaces (APIs) provide the ability to offload zeroing out block regions on back-end storage to a storage controller, such as V7000™. In this case, a single write command is issued to the V7000™, and the V7000™ handles the zero out block operation. This solution cannot be used for such devices as the IBM® ProtecTIER™ because the IBM® ProtecTIER™ is a storage gateway product that attaches to a wide variety of storage arrays, some of which do not support this capability. In the case of the IBM® ProtecTIER™, it is necessary to pad up to 1 PB of storage per ProtecTIER™ instance, and the time required to perform such a large scale operation is very tedious without some form of acceleration.

Accordingly, the mechanisms of the illustrated embodiments provide expedited file system padding processing while allowing for flexible deduplication repository scaling and eliminating dependency on back-end disk hardware. In one embodiment, metadata of a pre-allocated file system is captured, exported, and compressed. The exported and compressed metadata is then decompressed and imported into a new or existing data deduplication repository for configuring the data deduplication repository with minimum overhead. In other words, the metadata of a fully padded file system is imported into the deduplication repository to avoid having to perform the process independently.

Figure 1:
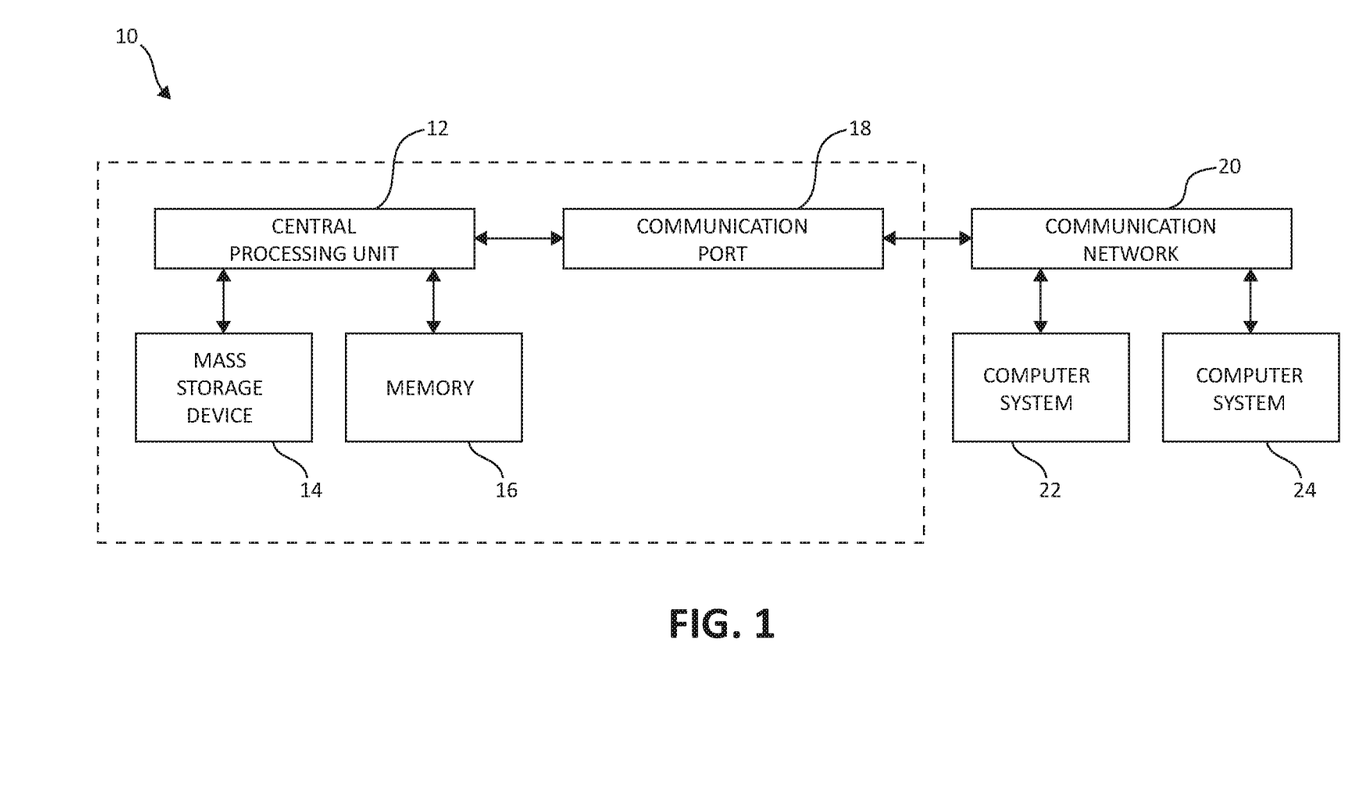
FIG. 1 is a block diagram showing a hardware structure for performing repository management in data deduplication systems, in which aspects of the present invention may be realized.

Turning first to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device (s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
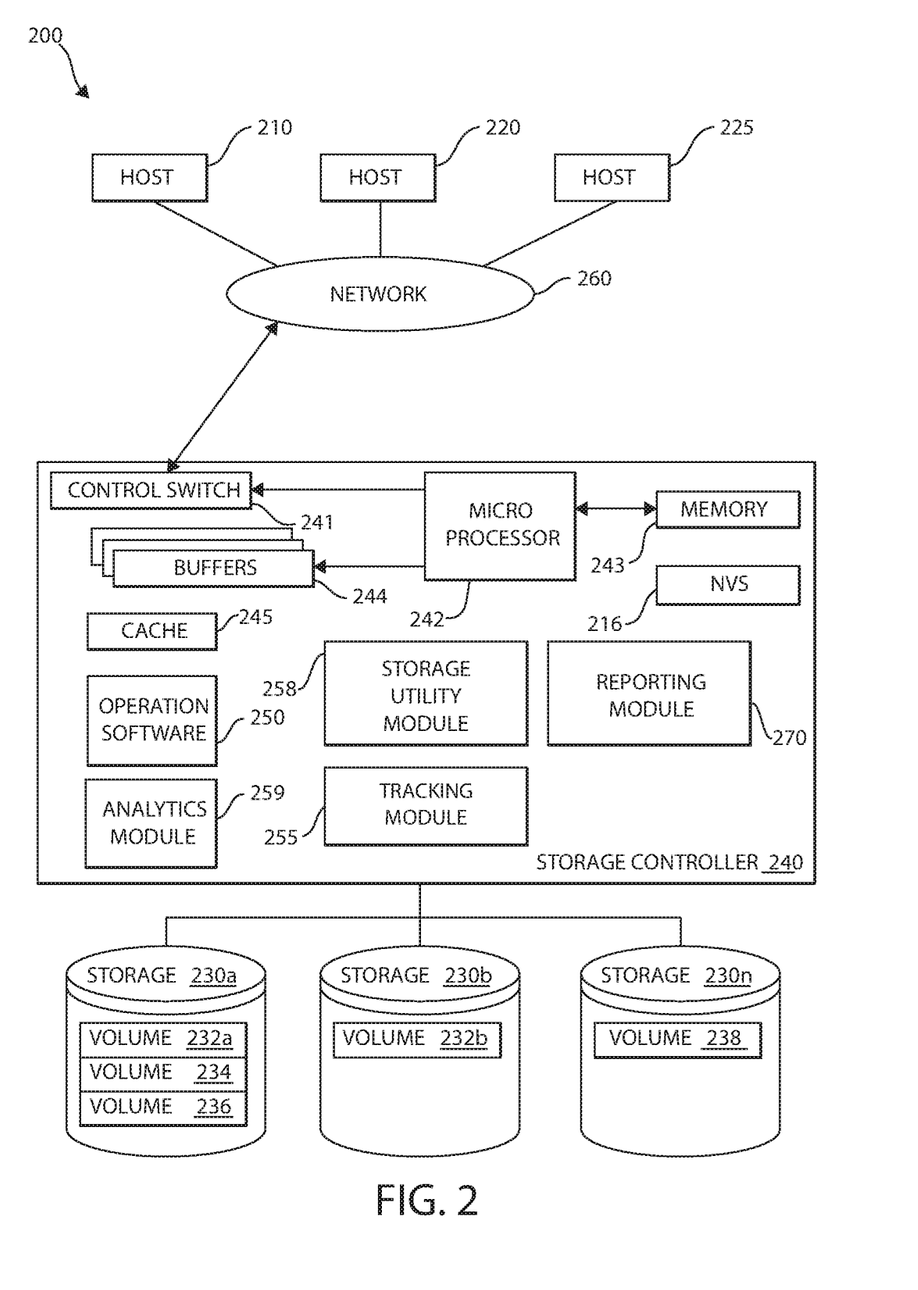
FIG. 2 is a block diagram showing a hardware structure of a data storage system in a computing storage environment, again in which aspects of the present invention may be realized.

FIG. 2 is an exemplary block diagram 200 showing a hardware structure of a data storage and deduplication system that may be used in the overall context of repository management in data deduplication systems. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of deduplication hardware and software, separately or in combination, may be utilized to implement the data deduplication functionality according to aspects of the illustrated embodiments.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, a storage utilization module 258, and a reporting module 270. The tracking module 255, storage utilization module 258 and reporting module 270 may operate in conjunction with each and every component of the storage controller 240, the hosts 210, 220, 225, and storage devices 230. The tracking module 255, storage utilization module 258 and reporting module 270 may be structurally one complete module or may be associated and/or included with other individual modules. The tracking module 255, storage utilization module 258 and reporting module 270 may also be located in the cache 245 or other components.

The tracking module 255, storage utilization module 258 and reporting module 270 may individually and/or collectively perform various aspects of the present invention as will be further described. For example, the tracking module 255 may perform tracking operations and related analytics in accordance with aspects of the illustrated embodiments. The storage utilization module 258 may also utilize analytics to determine physical or virtual storage capacities in view of deduplication functionality operational on particular storage devices. Finally, reporting module 270 may notify various portions of the data storage and deduplication system 200 about such various aspects as current capacity utilization, and so forth. As one of ordinary skill in the art will appreciate, the tracking module 255, storage utilization module 258, and reporting module 270 may make up only a subset of various functional and/or functionally responsible entities in the data storage and deduplication system 200.

The storage controller 240 includes a control switch 241 for controlling the fiber channel protocol, transmission control protocol/internet protocol (TCP/IP), Ethernet protocol, or other such standard, to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module 255, and the analytics module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric".

Figure 3:
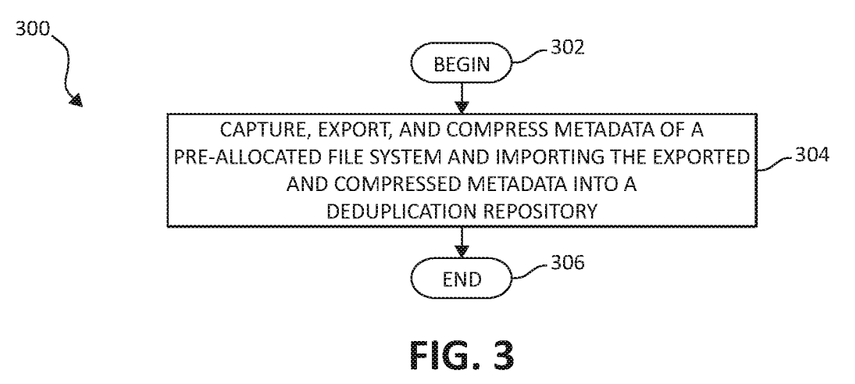
FIG. 3 is a flow chart diagram illustrating a method for repository management in data deduplication systems in accordance with various aspects of the present invention.

Turning now to FIG. 3, a flow chart diagram illustrating an exemplary method 300 for repository management in data deduplication systems, among other aspects of the illustrated embodiments, is depicted. The method 300 begins (step 302). Metadata of a pre-allocated file system is captured, exported, and compressed. The exported and compressed metadata is then decompressed and imported into a data deduplication repository for configuring, or padding, the data deduplication repository with minimum overhead (step 304). The method then ends (step 306).

In file systems in which it is possible to import and export file system metadata or the inode structure, importing and exporting such is minimal in comparison to the full size of a file system. In one embodiment, the present invention captures metadata of a pre-allocated file system, exports, and compresses it. When building a new deduplication repository or expanding an existing deduplication repository, the compressed metadata of the pre-allocated file system is decompressed and imported to the file system on the new or existing deduplication repository. This leverages the need for pre-allocated file systems during runtime of the deduplication system for optimal performance and also provides the advantage of a highly efficient method for file system pre-allocation that avoids the system having to write up to 1 PB of zeros.

In one embodiment, the compressed metadata for multiple pre-allocated file systems of varying size are provided in a code package (e.g. the IBM® ProtecTIER™ code package) by a manufacturer. By way of example, the code package may provide compressed, pre-allocated file system metadata for a 1 Terabyte (TB) file system, a 2 TB file system, a 4 TB file system, and an 8 TB file system.

Figure 4:
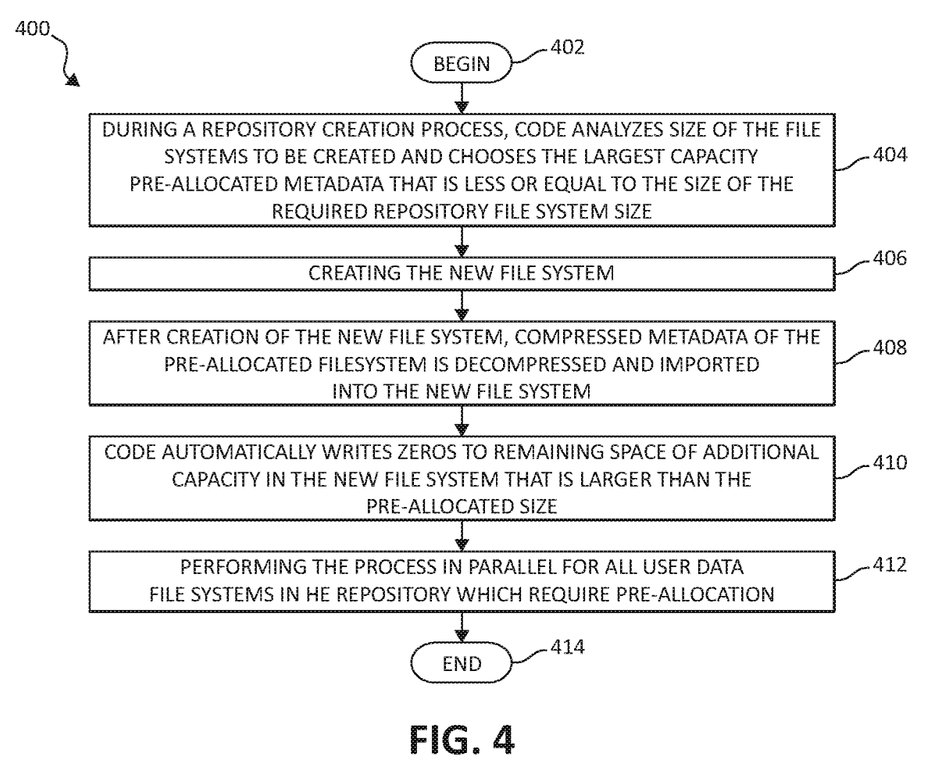
FIG. 4 is an additional flow chart diagram illustrating a method for repository management in data deduplication systems in accordance with various aspects of the present invention.

Continuing to FIG. 4, a flow chart diagram, illustrating an exemplary method 400 for repository management in data deduplication systems is illustrated, according to aspects of the present invention. In one embodiment, beginning at step 402, during a deduplication repository creation process in which the file systems are being allocated on back-end storage, the code package analyzes the size of the file systems needing to be created (correlated to logical unit number (LUN) size), and selects the largest capacity pre-allocated metadata being less than or equal in size to the required repository file system size (step 404). The new file system is then created (step 406). Upon creation of the new file system, the compressed metadata of the pre-allocated file system is then decompressed and imported into the new file system (step 408). If any additional capacity remains in the new file system that is larger than the size of the pre-allocated size of the imported pre-allocated file system, the code package automatically allocates, or pads, the additional capacity by writing zeros to the remaining space (step 410). The process of pre-allocation using the compressed and imported metadata of the pre-allocated file systems may be performed in parallel for all user data file systems in the repository requiring pre-allocation (step 412). The method ends (step 414).

In an alternative embodiment, the pre-allocated metadata is not provided as part of a code package (e.g. the IBM® ProtecTIER™ code package) by a manufacturer. In this embodiment, a first file system is fully allocated, or padded (has zeros fully written to the file system). The metadata of this file system is exported. During creation of a next file system (or a multiple of next file systems), the metadata from the first fully allocated file system is imported into the next file system. The configuration process is repeated in parallel until each of the newly created repository file systems are fully allocated.

In still another alternative embodiment, the system on which the allocation is performed is not a gateway, such as the IBM® ProtecTIER™ product, but is an appliance. In such a situation, the size of the user data file system portion of the repository is known, and therefore the compressed, pre-allocated metadata of the user data file system may be rapidly imported to the user data file systems without the need to pad the end of the file systems if they are larger than the pre-allocated metadata. In this embodiment, the file systems are created, pre-allocated file system metadata is decompressed and imported into the created file systems. This procedure may be done in parallel for all user data file systems within the repository.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for repository management in a data deduplication system, by a processor device, comprising:
    capturing, exporting, and compressing metadata of an inode structure of an entire pre-allocated file system from an existing deduplication appliance, the pre-allocated file system comprising a fully padded file system; wherein the exported and compressed metadata of the pre-allocated file system is decompressed and imported into a data deduplication repository of a new deduplication appliance, the data deduplication repository of the new deduplication appliance having an identical file system size as within the existing deduplication appliance, to initially configure or subsequently scale the inode structure of a file system of the data deduplication repository of the new deduplication appliance efficiently.

2. The method of claim 1, further comprising including the compressed metadata for a plurality of pre-allocated file systems according to a plurality of file system sizes within a code package provided by a manufacturer.

3. The method of claim 2, further comprising analyzing, by the code package, a size of the file system to be created during the configuration of the data deduplication repository; and
    selecting, by the code package, a largest capacity of the compressed metadata of one of the plurality of pre-allocated file systems being less than or equal in size to the size of the file system.

4. The method of claim 3, further comprising, upon creation of the file system, decompressing and importing the exported and compressed metadata into the created file system.

5. The method of claim 3, further comprising automatically padding additional capacity, by the code package, being larger than that of the selected largest capacity of the compressed metadata of one of the plurality of pre-allocated file systems.

6. The method of claim 1, further comprising performing the initial configuration of the data deduplication repository in parallel for all user data file systems within the data deduplication repository.

7. The method of claim 1, further including allocating a first file system, exporting metadata from the first file system, and importing the metadata into at least one of a plurality of next created file systems, the next created file systems importing metadata from the first file system in parallel.

8. A system for repository management in a data deduplication system, the system comprising:
    at least one processor device executing instructions stored in a memory, wherein upon executing the instructions, the processor device:
        captures, exports, and compresses metadata of an inode structure of an entire pre-allocated file system from an existing deduplication appliance, the pre-allocated file system comprising a fully padded file system; wherein the exported and compressed metadata of the pre-allocated file system is decompressed and imported into a data deduplication repository of a new deduplication appliance, the data deduplication repository of the new deduplication appliance having an identical file system size as within the existing deduplication appliance, to initially configure or subsequently scale the inode structure of a file system of the data deduplication repository of the new deduplication appliance efficiently.

9. The system of claim 8, wherein the processor device includes the compressed metadata for a plurality of pre-allocated file systems according to a plurality of file system sizes within a code package provided by a manufacturer.

10. The system of claim 9, wherein the processor device analyzes, by the code package, a size of the file system to be created during the configuration of the data deduplication repository, and
    selects, by the code package, a largest capacity of the compressed metadata of one of the plurality of pre-allocated file systems being less than or equal in size to the size of the file system.

11. The system of claim 10, wherein the processor device, upon creation of the file system, decompresses and imports the exported and compressed metadata into the created file system.

12. The system of claim 10, wherein the processor device automatically pads additional capacity, by the code package, being larger than that of the selected largest capacity of the compressed metadata of one of the plurality of pre-allocated file systems.

13. The system of claim 8, wherein the processor device performs the initial configuration of the data deduplication repository in parallel for all user data file systems within the data deduplication repository.

14. The system of claim 8, wherein the processor device allocates a first file system, exports metadata from the first file system, and imports the metadata into at least one of a plurality of next created file systems, the next created file systems importing metadata from the first file system in parallel.

15. A computer program product for repository management in a data deduplication system, by a processor device, the computer program product embodied on a non-transitory computer-readable storage medium having computer-readable program code portions stored therein, the computer-readable program code portions comprising:

an executable portion that captures, exports, and compresses metadata of an inode structure of an entire pre-allocated file system from an existing deduplication appliance, the pre-allocated file system comprising a fully padded file system; wherein the exported and compressed metadata of the pre-allocated file system is decompressed and imported into a data deduplication repository of a new deduplication appliance, the data deduplication repository of the new deduplication appliance having an identical file system size as within the existing deduplication appliance, to initially configure or subsequently scale the inode structure of a file system of the data deduplication repository of the new deduplication appliance efficiently.

16. The computer program product of claim 15, further including an executable portion that includes the compressed metadata for a plurality of pre-allocated file systems according to a plurality of file system sizes within a code package provided by a manufacturer.

17. The computer program product of claim 16, further including an executable portion that analyzes, by the code package, a size of the file system to be created during the configuration of the data deduplication repository, and
an executable portion that selects, by the code package, a largest capacity of the compressed metadata of one of the plurality of pre-allocated file systems being less than or equal in size to the size of the file system.

18. The computer program product of claim 17, further including an executable portion that, upon creation of the file system, decompresses and imports the exported and compressed metadata into the created file system.

19. The computer program product of claim 17, further including an executable portion that automatically pads additional capacity, by the code package, being larger than that of the selected largest capacity of the compressed metadata of one of the plurality of pre-allocated file systems.

20. The computer program product of claim 15, further including an executable portion that performs the initial configuration of the data deduplication repository in parallel for all user data file systems within the data deduplication repository.

21. The computer program product of claim 15, further including an executable portion that allocates a first file system, exports metadata from the first file system, and imports the metadata into at least one of a plurality of next created file systems, the next created file systems importing metadata from the first file system in parallel.

* * * * *